United States Patent [19]
Altman

[11] Patent Number: 5,206,309
[45] Date of Patent: Apr. 27, 1993

[54] HEAT STABLE FILM COMPOSITION COMPRISING POLYEPSILONCAPROLACTAM

[75] Inventor: Carl E. Altman, Pitman, Pa.

[73] Assignee: Allied Signal Inc., Morris Township, Morris County, N.J.

[21] Appl. No.: 665,394

[22] Filed: Mar. 6, 1991

[51] Int. Cl.⁵ .............................................. C08L 77/00
[52] U.S. Cl. ...................................... 525/432; 525/420
[58] Field of Search ........................................... 525/432

[56] References Cited

U.S. PATENT DOCUMENTS 3,995,084  11/1976  Berger et al. .................... 525/432
4,665,135   5/1987  Tse et al. ......................... 525/432
5,032,633   7/1991  Schlobohm et al. ............... 524/168

FOREIGN PATENT DOCUMENTS 170385    6/1985  European Pat. Off. .
53-090383 9/1978  Japan .
2-245058  9/1990  Japan .

*Primary Examiner*—Ana L. Carrillo
*Attorney, Agent, or Firm*—Roger H. Criss

[57] ABSTRACT

The present invention provides a heat stable film composition comprising polyepsiloncaprolactam and poly-(epsiloncaprolactam-hexamethylene adipamide) copolymer which finds particular use in applications wherein the film is subjected heat for a prolonged period of time, such as in an oven or an autoclave.

9 Claims, No Drawings

HEAT STABLE FILM COMPOSITION COMPRISING POLYEPSILONCAPROLACTAM

BACKGROUND

1. Field of the Invention

The present invention relates to polymeric film compositions; more particularly the present invention relates to polymeric film comprising polyepsiloncaprolactam and a poly(epsiloncaprolactam/hexamethylene adipamide) copolymer which features good thermal stability.

2. Description of the Prior Art

Whereas there are known to the art a wide variety of films which find great utility, there remain particular applications wherein films are subjected to conditions which often act to degrade the film's compositon and overall performance, an undesired effect.

There exist applications wherein it is required to subject a film to elevated temperatures for a prolonged period of time wherein it would be highly desirous that the film retain good physical properties, including tensile properties throughout the period during which the film is subjected to high heat conditions. Presently, films comprising nylon 6 and conventional heat stabilizers are known to the art and are readily commerically available, but in many cases such films do not provide sufficient resistance to degradation under various conditions. Accordingly there remains a continuing need in the art for improved films and improved film forming compositions which overcome the limitations of the prior art. It it to these objects, as well as others, that the present invention is addressed.

SUMMARY

In one aspect, the present invention provides a film having a composition comprising polyepsiloncaprolactam and a poly(epsiloncaprolactamhexamethylene adipamide) copolymer which provides features which include good thermal stability.

In another aspect of the invention there is provided a film forming composition comprising polyepsiloncaprolactam and a poly(epsiloncaprolactamhexamethylene adipamide) copolymer and which further includes a dye, pigment or other coloring agent, wherein the film features good thermal stability.

In a further aspect of the present invention, there is provided a process for the production of a film comprising polyepsiloncaprolactam and a poly(epsiloncaprolactam-hexamethylene adipamide) copolymer and which may optionally contain a dye, pigment or other coloring agent, wherein the film produced by the process features good thermal stability.

In a still further aspect of the invention there is provided an improvement in polymeric films which exhibit good retention of physical properties after prolonged exposure to heat.

In yet a further aspect of the invention, there is provided a film composition comprising polyepsiloncaprolactam and a poly(epsiloncaprolactamhexamethylene adipamide) and one or more conventional additives.

DESCRIPTION OF THE PREFERRED EMBODIMENTS

The present invention provides a heat stable film which comprises polyepsiloncaprolactam and a poly(epsiloncaprolactam-hexamethylene adipamide) copolymer, and which optionally further comprises a coloring agent.

In accordance with the invention, the polyepsiloncaprolactam (hereinafter interchangeably referred to as "nylon 6") is a homopolymer which may be formed by any means known to the art. Suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc, Vol. 10, pps.487–491, (1969).

The production of nylon 6 may be by conventional processes, including the polymerization of $\epsilon$-caprolactam.

The nylon 6 which find use in the present invention has a number average molecular weight as measured in formic acid in the range of about 15,000 to about 40,000, preferably in the range of about 25,000 to about 35,000. The nylon 6 may be washed, unwashed or partially washed. The nylon 6 may have balanced end groups, or be monofunctionally or difunctionally terminated.

The compositions of the present invention further comprise a poly(epsiloncaprolactam-hexamethylene adipamide) copolymer (which is herein interchangeably referred to as nylon 6/66). The nylon 6/66 copolymer may be formed by any conventional means known to the art, including but not limited to processes wherein suitable monomeric constituents, i.e. caprolactam, hexamethylene diamine, and adipic acid are reacted to form a copolymer. In a further conventional means, a salt of hexamethylene diamine and adipic acid is added to caprolactam, and these constituents are reacted to form a copolymer.

In the practice of the instant invention, the relative proportion of nylon 6 to nylon 66 may vary widely, with the proportion of nylon 6 segments comprising any amount between 0.1% to 99.9% of the nylon 6/66 copolymer structure. The nylon 6/66 copolymer may be either a block type copolymer or a random type copolymer; preferably and most preferably the nylon 6/66 copolymer is a random type copolymer. Preferably the nylon 6 segments of the nylon 6/66 copolymer comprises between 10% and 35%; most preferably the nylon 6 comprises between 20% and 30% of the nylon 6/66 copolymer.

The nylon 6/66 copolymer has a number average molecular weight as measured in a 95% sulfuric acid solution, in the range of about 15,000 to about 40,000, preferably in the range of about 20,000 to about 35,000. The nylon 6/66 copolymer may be washed, unwashed or partially washed.

In forming the film compositions of the instant invention, the relative ratio of the nylon 6 to the nylon 6/66 copolymer may be varied over a broad range so that the nylon 6 comprises between about 0.01% to about 99.99% of sum of the weights of the nylon 6 and the nylon 6/66 of a film composition. It is to be understood that the relative ratio of the nylon 6 to the nylon 6/66 in a compositon may be purposely varied and selected so to produce a film having particular desired physical properties. It has been seen that while compositons wherein the amount of nylon 6 relative to the nylon 6/66 is relatively high, for example in compositions wherein this nylon 6:nylon6/66 ratio is approximately 85%:15%, that such films show a marked improvement in physical properties, particularly in tensile properties after prolonged exposure to elevated temperatures; the tensile modulus is seen to decrease with the inclusion of even minor amounts of nylon 6/66 in such film forming composition. It has also been observed that film compositions wherein the amount of nylon 6 relative to the nylon 6/66 is relatively equal, for example in compositions wherein this nylon 6:nylon6/66 ratio is approximately 50%:50%, that such films excellent retention of physical properties, particularly in tensile properties after prolonged exposure to elevated temperatures. It should be apparent then to one skilled in the art that the physical properties of a film, particularly the tensile modulus, may be to a great degree controlled by the proper selection of the ratio of the nylon 6:nylon 6/66 in the film forming composition, generally increasing the amount of nylon 6/66 copolymer acts to markedly reduce the tensile modulus of the film. It should further be apparent to one skilled in the art that a broad range of film compositions providing a broad range of physical properties may be produced in accordance with the present invention's teaching; the particular compositions which are to have desired physical properties may be determined by experimentation and evaluation of various film samples.

While not wishing to be bound by any theory, it is hypothesized that the films formed from the compositions taught in the present specification provide good thermal stability subsequent to heat ageing of the film due to the inclusion of the nylon 6/66 copolymer within the film forming composition. The nylon 6/66 copolymer provides good compatiblity with the nylon 6 of the composition, but exhibits a slower crystallization rate when subjected to prolonged exposure to heat; this effect is belived to reduce the overall rate of crystallization of film compositions comprising the nylon 6 and the nylon 6/66 copolymer and consequent reduction of embrittlement of the film during prolonged exposure to heat, such as in an oven or in an autoclave. As a consequence, the films formed according to the present invention's teaching feature good retention of physical properties and reduced embrittlement especially as compared to similar compositions comprising nylon 6 but lacking nylon 6/66 copolymer in its composition.

As an optional constituent, the film compositions of the present invention may further comprise a coloring agent, which agent may be a dye, pigment or other coloring agent or material which is useful in imparting a color modification to the noncolored nylon 6 and nylon 6/66 copolymer, and which are not found to have a detrimental effect on the film compositions, particularly subsequent to heat ageing. Useful coloring agents include those which are known to the art as suitable for coloring polyamide comprising compositions and generally include inorganic pigments, metal oxides, organic pigments, organic dyes, as well as other coloring agents and color concentrates known to the art.

The compositions of the instant invention may also include one or more conventional additives which do not materially affect the physical properties of the films including: lubricants and mold release agents, coloring agents including dye and pigments, flame-retardants, fibrous and particulate fillers and reinforcing agents (both organic and inorganic), nucleators, ultraviolet light stabilizers, as well as other additives. These conventional additives may be incorporated into compositions at any suitable stage of the production process; typically such conventional additives are included in the mixing step and included in an extrudate.

It is to be noted that a beneficial feature of the present invention is that compositions according to the present teachings do not require the inclusion of conventional heat stablizers, commonly copper halides, in the film compositions while still providing excellent physical characteristics consequent to exposure to elevated temperatures.

By way of example, representative ultraviolet light stabilizers include various substituted resoursinols, salicylates, benzotriazole, benzophenones, and the like.

Suitable exemplary lubricants and mold release agents include stearic acid, stearyl alcohol, stearamides.

Exemplary flame-retardants include organic halogenated compounds, including decabromodiphenyl ether and the like.

By way of example, suitable coloring agents including dyes and pigments include cadmium sulfide, cadmium selenide, titanium dioxide, phthalocyanines, ultramarine blue, nigrosine, carbon black and the like.

Exemplary plasticizers include lactams such as caprolactam and lauryl lactam, sulfonamides such as o,p-toluenesulfonamide and N-ethyl, N-butyl benzylsulfonamide, o,p-toluenesulfonamide, combinations of any of the above, as well as other plasticizers known to the art.

Blending or mixing of the constituents which comprise the film compositions may be by any effective means which will effect their uniform dispersion. All of the constituents may be mixed simultaneously or separately by a mixer, blender, kneader, roll, extruder, or the like in order to assure a uniform blend of the constituents. In the alternative, the nylon 6 and the nylon 6/66 may be blended or mixed by mixer, blender, kneader, roll, extruder, or the like in order to assure a uniform blend of the constituents and the resultant mixture is melt-kneaded with the remaining constituents in an extruder to make a uniform blend. A common method is to melt-knead a previously dry-blended composition further in a heated extruder provided with a single-screw, or in the alternative, a plurality of screws, extrude the uniform composition into strands, and subsequently chop the extruded strands into pellets. In an alternative and a preferred method, the dry-blended composition is provided to a film forming apparatus which comprises a heated extruder having at least a single screw, which heated extruder plastificates the constituents of the dry-blended composition and which forms a film therefrom. This method is generally to be preferred as it provides an overall reduction of process and handling steps necessary to form a useful film combination therefrom.

As noted immediately above, the film compositions of the instant invention may be formed into films by conventional methods using conventional film forming apparati. Conventional methods include the production of films by blown film techniques, by extruding the film through a film forming die and optionally casting the film, calendering, and forming a film forming composition into a billet and subsequently skiiving a film from the billet. In one of these methods, a film forming composition is plastificated and melt blended in an extruder to form an extrudate, which extrudate is then heated and pressurized and extruded through a film forming die and then transported to a casting roll. In another method, the film forming apparatus may be one which is referred to in the art as a "blown film" apparatus and includes a circular die head through which the plastificated film composition is forced and formed into a film "bubble", which is ultimately collapsed and formed into a film.

The films may optionally be stretched or oriented in any direction if so desired. In such a stretching operation, the film may be stretched in either the direction coincident with the direction of movement of the film being withdrawn from the casting roll, also referred to in the art as the "machine direction", or in a direction which is perpendicular to the machine direction, and referred to in the art as the "transverse direction", or in both the machine direction and the transverse direction.

The films formed by any of the above methods may be of any thickness desired and includes those which have thickenesses less than 100 mils. As is known to the art, a "mil" is a common unit equivalent to 0.001 inch and is typically used to describe film thicknesses. Preferably, the films have a thickness in the range of about 0.1 mil and about 10 mils; most preferably the films have a thickness of between about 1 mils and 5 mils. While such thicknesses are preferred as providing a readily flexible film, it is to be understood that other film thicknesses may be produced to satisfy a particular need and yet fall within the present invention's scope; such thickensses which are contemplated include plates, thick films, and sheets.

The determination of the physical characteristics of the films may be determined using any commonly known testing procedure, including the protocols defined by the American Society of Testing Materials, including but not limited to those designated under the protocols of ASTM D 882-83 "Standard Testing Methods for Tensile Properties of Thin Plastic Sheeting". Preferably, the samples are evaluated in both the machine direction and the transverse directions. In accordance with the protocol of the ASTM D 882-83 tests, the tensile modulus is reported in units of pounds per square inch ,"psi", the tensile yield strength is reported in units of psi, the yield elongation is reported in units of percent "%", the ultimate tensile strength is reported in units of psi, and the ultimate tensile elongation is reported in units of %.

A further test useful in evaluating the performance of a film subsequent to exposure of film samples to elevated temperatures is known to practitioners in the art as the "Boeing Company BMS 15-13C+ test. This test requires that standard samples of a film of dimesions 10 inches by 1 inch and having either a 2 mil or a 3 mill thickness be heat aged in a circulating air oven which is maintained at 350 deg.F for a period of four hours, after which the samples are withdrawn and tested between 20-40 minutes after they are withdrawn. At this point the properties of the film samples are evaluated in both the machine directions and the transverse directions in accordance with ASTM D 882-83 test procedures.

The films provided in the present invention provide good retention of physical properties and feature low embrittlement when subjected to the heat for several hours. By way of example, the films provided in the present invention find particular utility in the formation of parts or articles wherein the formation of the article requires that a "preform" of the article, typically containing one or more layers of a an organic or inorganic web, such as a unidirectional prepreg, a woven or nonwoven mat, a woven 3-dimensional mat, or other type of web, which is impregnated with an at least partially uncured resin, is wrapped in a film, and the wrapped preform is then subjected to elevated temperatures for a period of time, usually in excess of one hour.

EXAMPLES

In the following examples, it is to be understood that all references to percentages when used in conjunction with the description of a constituent of a compositions are to be understood as referring to "percent by weight" of the constituent with regard to the composition of which it forms a part. All exceptions to this convention will be noted as such.

In the formation of the compositions, the nylon 6 used was a nylon 6 homopolymer resin characterized as having a molecular weight of approximately 25,000, a viscosity of about 150 as measured in formic acid, and balanced terminal end groups. The nylon 6/66 copolymer resin used was a copolymer which may be characterized as having a ratio of nylon 6 to nylon 66 groups of this random copolymer of approximately 25:75, a viscosity of approximately 4-5 as measured in 95% concentrated solution of sulfuric acid. This copolymer is presently commercially available from the E.I. DuPont de Nemours Co., Wilmington, Del., U.S.A. under the trade designation of "Zytel FE 3356". The compositions optionally incorporated a minor amount of a conventional organic color concentrate which utilized an organic dye, which was used to impart a color to the final film. In the formulation of one of the comparative examples, a conventional heat stablizing agent, copper halide was use, which is readily commercially available.

EXAMPLE 1

The composition according to Example 1 provides a comparative example of a composition comprising a nylon 6 homopolymer and a conventional coloring agent; as such this example does not comprise a composition according to the present invention's teaching. The constituents used to form the composition comprised 99.7 weight percent of a nylon 6 homopolymer, and 0.3 percent of a coloring agent. This composition and its constituents is denoted on Table 1.

TABLE 1

|  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- |
| nylon 6: | 99.7 | 97.7 | 94.7 | 84.7 | 74.7 | 59.7 | 49.7 | 94.7 | 84.7 |
| nylon 6/66 copolymer: | — | — | 5 | 15 | 25 | 40 | 50 | 5 | 15 |
| color concentrate: | 0.3 | 0.3 | 0.3 | 0.3 | 0.3 | 0.3 | 0.3 | 0.3 | 0.3 |
| copper halide: | — | 2 | — | — | — | — | — | — | — |

The composition was formed by first dry-blending the constituents, and then supplying them to the feed hopper of a 2 inch Sterling single screw extruder equipped with a general purpose mixing screw having a length to diameter ratio, "L/D" of 24/1. This extruder comprised 4 heating zones which were maintained at the following temperatures in the respective zones: zone 1, 238 deg.C; zone 2, 254 deg.C; zone 3, 254 deg.C; zone 4, 254 deg.C. The pressure in the extruder was 2200 psi. The extruder was operated to produce approximately 30 lbs/hours of the composition; the screw rotational speed was approximately 50 rpm. The extrudate exiting the extruder was then forced into a conventionl film forming die head of the "coathanger" type, which had a die gap of 0.030 inches (30 mils), and a width of 19 inches. The die head was maintained at a temperature of 250 deg.F; the rate of film productions was approximately 78 feet/min. The extruded film was contacted with a casting roll whose temperature was maintained at approx. 195 deg.F, and a heat set roll maintained at approx. 70 deg.F, both rolls were driven at the same speed. A film having a width of 12 inches, and a thickness of approximately 2 mil was produced therefrom.

The physical properties of the film were also evaluated in both the machine direction and the transverse directions, using non-heat aged samples in accordance with the ASTM D 882-83 test protocols outlined above. The results of these tests are outlined on Table 2.

TABLE 2

|  | Dir.* | Ex. 1 | Ex. 3 | Ex. 4 | Ex. 5 | Ex. 6 | Ex. 7 |
|---|---|---|---|---|---|---|---|
| Tensile Modulus: | MD: | 80590 | 61360 | 61440 | 61660 | 58170 | 52670 |
|  | TD: | 97760 | 85700 | 75550 | 76020 | 69570 | 76230 |
| Tensile Yield Strength: | MD: | 5064 | 4910 | 4841 | 4572 | 4161 | 4150 |
|  | TD: | 5420 | 4656 | 4784 | 4865 | 4403 | 4375 |
| Yield Elongation: | MD: | 14 | 21 | 23 | 21 | 23 | 21 |
|  | TD: | 12 | 15 | 16 | 14 | 15 | 14 |
| Ultimate Tensile Strength: | MD: | 16930 | 17850 | 18300 | 18060 | 19270 | 19660 |
|  | TD: | 17720 | 14150 | 14260 | 16000 | 15640 | 15420 |
| Ultimate Tensile Elongation: | MD: | 332 | 328 | 317 | 321 | 329 | 340 |
|  | TD: | 392 | 245 | 354 | 378 | 388 | 392 |

*direction
"MD" indicates Machine Direction
"TD" indicates Transverse Direction

To evaluate the behaviour of the film after exposure to elevated temperatures, from the film so formed, a 10 inch by 10 inch sample square was cut. The sample square was then placed in an air circulating oven maintained at a temperature of 350 deg.F. After an interval of 70 minutes, the sample was removed from the oven and it was observed to be brittle and cracked, and was thereby unsuited to be tested by the "Boeing Company BMS 15-13C" test protocols outlined above.

EXAMPLE 2

The composition of Example 2 is provided as a comparative example and comprises a conventional heat stabilizer, copper halide, which is known to the art as useful in polyamide comprising compositions and which has been described above. The composition was formed into a film under essentially the same production conditions used to form the film of Example 1.

The physical behavior of the film was also evaluated in both the machine direction and the transverse directions, using non-heat aged samples in accordance with the ASTM D 882-83 test protocols outlined above. The results of these tests are outlined on Table 3.

TABLE 3

|  | Dir.* | Ex. 2 | Ex. 8 | Ex. 9 |
|---|---|---|---|---|
| Tensile Yield Strength, | MD: | 5072 | 4410 | 3938 |
| Ambient Temp.: | TD: | 4896 | 4797 | 4424 |
| Tensile Yield Strength, | MD: | 9537 | 9309 | 7826 |
| Heat Aged: | TD: | 9661 | 9029 | 7907 |
| Yield Elongation, | MD: | 21 | 23 | 21 |
| Ambient Temp.: | TD: | 15 | 19 | 14 |
| Yield Elongation, | MD: | 23 | 30 | 28 |
| Heat Aged: | TD: | 12 | 21 | 20 |
| Ultimate Tensile Strength, | MD: | 16346 | 15807 | 16616 |
| Ambient Temp.: | TD: | 14861 | 14119 | 13680 |
| Ultimate Tensile Strength, | MD: | 15705 | 12991 | 13250 |
| Heat Aged: | TD: | 9542 | 7867 | 12952 |
| Ult. Tensile Elongation, | MD: | 323 | 318 | 336 |

TABLE 3-continued

|  | Dir.* | Ex. 2 | Ex. 8 | Ex. 9 |
|---|---|---|---|---|
| Ambient Temp: | TD: | 380 | 360 | 359 |
| Ult. Tensile Elongation, | MD: | 291 | 297 | 261 |
| Heat Aged: | TD: | 258 | 165 | 346 |

*direction
"MD" indicates Machine Direction
"TD" indicates Transverse Direction

EXAMPLES 3-7

The constituents used to form the compositions according of examples 3-7 are listed with their respective weight percentages on Table 1. For each composition, the constituents were processed on the same apparatus and generally in accordance with the apparatus and process used and described in conjunction with Example 1. The compositions of Examples 3-7 were used to form cast films having final dimensions of 12 inches width, and approximately 2 mil thicknesses.

Samples of each of the individual constituents were evaluated according to the protocols of the ASTM D 882-83 tests in both machine and transverse directions, and the respective test results from each of the evaluations is noted on Table 2.

To evaluate the behaviour of the film after exposure to elevated temperatures, 10 inch by 10 inch sample squares were cut. The sample squares were placed in an air circulating oven maintained at a temperature of 350 deg.F. After an interval of 70 minutes, the samples were removed from the oven from the oven for inspection, where in was noted that each of the samples remained flexible. The samples were then returned to the oven, and 70 minutes later, the oven was deactivated and the contents allowed to cool. Again, the samples were removed from the oven and examined; all were noted to remain flexible. The same samples were subsequently reheated by introducing them into the air circulating oven at 350 deg.F for a further term of 255 minutes, after which the samples were removed and examined; all of the samples of the compositions of Examples 3-7 exhibited good flexible behavior.

EXAMPLES 8-9

The constituents used to form the compositions according of examples 8-9 are listed with their respective weight percentages on Table 1. For each composition, the constituents were processed on the same apparatus and generally in accordance with the apparatus and process used and described in conjunction with Example 2. The compositions of Examples 3-7 were used to form cast films having final dimensions of approximately 12 inches width, and approximately 2 mil thicknesses.

Samples of each of the individual constituents were evaluated according to the protocols of the ASTM D 882-83 and with the Boeing Company BMS 15-13C tests in both machine and transverse directions, and the respective test results from each of the evaluations is noted on Table 3.

It may be observed by the comparison of the test results as reported on Table 2 and Table 3, particularly in contrast to the results observed with the comparative Examples 1 and 2, that compositions of films of the present invention provide excellent physical properties after prolonged exposure to elevated temperatures. It is also notable that such properties were achieved and attained without the use of conventional heat stabilizing additives.

It will be appreciated that the instant specifications and examples set forth herein are by way of illustration and not limitation, and that various modifications and changes may be made without departing from the spirit and scope of the present invention, whose limitations are bounded only by the appendant claims.

I claim:

1. A film comprising:
   polyepsiloncaprolactam and
   poly(epsiloncaprolactam-hexamethylene adipamide) copolymer,
   wherein said copolymer has polyepsiloncaprolactam segments comprising between 10% to 35% of said copolymer.

2. A film according to claim 1, wherein said polyepsiloncaprolactam has a number average molecular weight as measured in formic acid in the range of 15,000 to 40,000.

3. A film according to claim 2, wherein the polyepsiloncaprolactam has a number average molecular weight as measured in formic acid in the range of 25,000 to 35,000.

4. A film according to claim 1, wherein said poly(epsiloncaprolactam-hexamethylene adipamide) copolymer is a random copolymer.

5. A film according to claim 1, wherein said poly(epsiloncaprolactam-hexamethylene adipamide) copolymer is a block copolymer.

6. A film according to claim 1 which further comprises a coloring agent.

7. A film according to claim 5, wherein said coloring agent is selected from the group consisting of inorganic pigments, metal oxides, organic pigments and organic dyes.

8. A film according to claim 1 which further comprises an additive selected from the group consisting of lubricants, mold release agents, dyes, pigments, flame-retardants, fibrous fillers, particulate fillers, organic reinforcing agents, inorganic reinforcing agents, nucleators and ultraviolet light stabilizers.

9. A film according to claim 1, wherein said copolymer has polyepsiloncaprolactam segments comprising between 20% to 30% of said copolymer.

* * * * *